(12) United States Patent  (10) Patent No.: US 9,147,097 B1
McGill  (45) Date of Patent: Sep. 29, 2015

(54) AUDIO FILE ENABLED SYNTHETIC BARCODE MODULE

(71) Applicant: Randy McGill, St. Augustine, FL (US)

(72) Inventor: Randy McGill, St. Augustine, FL (US)

( * ) Notice: Subject to any disclaimer, the term of this patent is extended or adjusted under 35 U.S.C. 154(b) by 0 days.

(21) Appl. No.: 14/509,681

(22) Filed: Oct. 8, 2014

(51) Int. Cl.
*G06K 7/10* (2006.01)
*G06K 7/14* (2006.01)
*G06K 5/00* (2006.01)
*G06K 19/06* (2006.01)

(52) U.S. Cl.
CPC ............... *G06K 7/1404* (2013.01); *G06K 5/00* (2013.01); *G06K 19/06112* (2013.01)

(58) Field of Classification Search
USPC ............. 235/462.01, 462.45, 472.01–472.03, 235/375, 454, 455
See application file for complete search history.

(56) References Cited

U.S. PATENT DOCUMENTS

| 3,684,868 A * | 8/1972 | Christie et al. ............ 235/462.04 |
| 2002/0074404 A1 * | 6/2002 | Drumm ..................... 235/462.01 |
| 2009/0102296 A1 * | 4/2009 | Greene et al. ................. 307/149 |
| 2009/0261166 A1 * | 10/2009 | Lawson et al. ................ 235/449 |

* cited by examiner

*Primary Examiner* — Tuyen K Vo
(74) *Attorney, Agent, or Firm* — Mark Young, PA

(57) ABSTRACT

A coupon management system includes a synthetic barcode phone. The synthetic barcode phone comprises light management components and a controller. The light management components include both an optical receiver (e.g., camera or light sensor) and an optical emitter (e.g., display elements). A processor decodes drive data from audio files corresponding to barcodes. The decoded data is used to drive the controller which causes the emitter to emit light pulses that emulate light reflected from a scanned barcode to communicate the coupon barcode optically.

16 Claims, 11 Drawing Sheets

Scan

AUDIO FILE ENABLED SYNTHETIC BARCODE MODULE

RELATED APPLICATIONS

This application is a continuation in part and claims the benefit of priority of pending U.S. Nonprovisional application Ser. No. 12/897,812 filed Oct. 5, 2010, the entire contents of which are incorporated herein by this reference and made a part hereof, which is a continuation in part of and claims the benefit of priority of U.S. Nonprovisional application Ser. No. 12/616,881, filed Nov. 12, 2009, the entire contents of which are incorporated herein by this reference and made a part hereof, which is a continuation in part and claims the benefit of priority of U.S. Nonprovisional application Ser. No. 12/034,448, filed Feb. 20, 2008, which is a continuation in part and claims the benefit of priority of U.S. Nonprovisional application Ser. No. 11/160,514, filed Jun. 27, 2005, the entire contents of which are incorporated herein by this reference and made a part hereof.

FIELD OF THE INVENTION

This invention generally relates to barcodes, and more particularly, to a system and method for receiving barcode data encoded in an audio output file, decoding the signal stream and communicating the barcode data to a barcode reader via optical communication by controllably flashing elements of a display screen at an optically effective color.

BACKGROUND

A point of sale (POS) terminal comprises hardware and software used for checkouts. Such systems are widely used in retail establishments, including, but not limited to grocery stores, restaurants and countless other places of business. Among the various types of equipment used by POS terminals is a barcode reader (or barcode scanner).

As is well known, a barcode reader optically senses a barcode image and produces electronic signals corresponding to the sensed image. One type of reader is a pen-type reader that consists of a light source and a photodiode that are placed next to each other in the tip of a pen or wand. The photodiode measures the intensity of the light from the light source that is reflected back by white spaces in the barcode. Processing circuitry generates a waveform corresponding to the widths of the bars and spaces in the barcode. The waveform is then decoded.

Another type of reader is a digital camera or CCD reader, which uses an array of light sensors to measure the intensity of emitted ambient light from the bar code immediately in front of it. A voltage pattern identical to the pattern in a bar code is generated in the reader by sequentially measuring the voltages across each sensor.

Neither a pen-type nor a CCD/camera-type reader is the most popular type of reader for POS terminals. Laser scanners predominate. In general, they work the same way as pen type readers except that they use a laser beam as the light source and typically employ either a reciprocating mirror or a rotating prism to scan the laser beam back and forth across the bar code. As with the pen type reader, a photodiode measures the intensity of the light reflected back from the bar code. In both pen readers and laser scanners, the light emitted by the reader is rapidly varied in brightness with a data pattern and the photodiode receive circuitry is designed to detect only signals with the same modulated pattern. Laser scanners operate quickly and reliably. With an arrangement of mirrors and lenses, a laser scanner station of a POS system effectively scans barcodes on merchandise so long as the barcode is passed through the scanning field, even though the barcode may not directly face the scanner and may never come to a complete rest in the scanning field. Pen and CCD scanners cannot do this.

While conventional laser scanners are superb at reliably scanning printed barcodes, for various reasons they cannot reliably scan barcodes displayed as images on electronic displays. Some CCD/camera type scanners are useful for scanning barcodes displayed as images on electronic displays; however, for various reasons, these types of scanners are not in widespread use. One reason may be that they require the barcode to be stationary immediately in front of the scanner. Such precise positioning requirements would cause the grocery checkout process to grind to a halt. Another reason is relatively high cost. Most retailers have little or no reason to abandon their fully functional laser scanners for more temperamental and costly CCD/camera type scanners.

In recent years, with the proliferation of cell phones, various mobile applications have been conceived to help manage coupons. A goal of such applications is facilitating access to coupons via a shopper's cell phone. No one would dispute that on-demand mobile access to coupons would be highly desirable. The problem with these applications is that they do not work well, or at all, with the vast majority of existing POS systems. A coupon barcode displayed on a cell phone display cannot be read by most laser scanners. An alphanumeric coupon code may be useful for online purchases, but is simply not practical for most retail POS systems. Although there may be special exceptions, conventional POS systems are simply not configured to communicate (e.g., wirelessly) with cell phones or receive coupon data communicated from cell phones (e.g., via SMS, email, or otherwise). Thus, applications that contemplate Bluetooth, Wi-Fi or SMS communication of coupon data to a handheld electronic device are impractical, or of extremely limited utility, today.

Another shortcoming of conventional coupons is security. According to an article entitled "Coupon Fraud Grows" in the Mar. 4, 2010 edition of the Wall Street Journal, the use of counterfeit coupons for groceries and other items has risen as budget-conscious consumers increasingly get their coupons from online sources. Today it is easy to craft coupons with barcodes that appear legitimate to check-out clerks and can be scanned at the POS. To combat such fraud, sophisticated wholesalers have begun including watermarks and holograms on their legitimate coupons, making the fraudulent coupons easy for them to spot. However, many wholesalers and printed media are not equipped to implement such protections. Additionally, check-out clerks are not trained to distinguish a real from a fake coupon for every possible brand.

What is needed is a practical module for an electronic device to receive electronically stored barcode data and optically communicate electronically stored barcode data to conventional barcode readers. What is also needed is a cost effective alternative to conventional printed coupons, something that is compatible with the ubiquitous laser barcode scanners of conventional POS systems. Preferably, the alternative enables on-demand electronic retrieval of coupons for use at a conventional POS.

The invention is directed to overcoming one or more of the problems and solving one or more of the needs as set forth above.

SUMMARY OF THE INVENTION

To solve one or more of the problems set forth above, in an exemplary implementation of the invention, a barcode data management system that includes a synthetic barcode module is provided. An exemplary programmable synthetic barcode module comprises an audio file, light emission components and a controller. A player plays an audio file. Audio output from the audio file is modulated in such a way as to correspond to barcode data using a digital to audio modulation scheme. The light emission components driven by a controller emit light pulses that emulate light reflected from a scanned barcode. The light emission components include screen elements (e.g., pixels or LEDs) of a display screen. The controller interfaces with a compatible microprocessor or microcontroller and receives signals from a demodulated audio signal stream corresponding to one or more barcodes. The controller causes the light emitting components to generate signals that cause the light management components to emit, via the LED. The generated signals are driver signals that cause the light emitting components to emit the light pulses that emulate light reflected from a scanned barcode to communicate the barcode optically. A sensor may receive light from a scanner to enable the system to determine if the received light pulses correspond to a barcode scanner by checking stimulus timing (e.g., by determining if the timing of received light pulses corresponds to light pulses emitted from a barcode scanner).

In one embodiment, the synthetic barcode module is a key part of a system comprising a smart phone, tablet or other similar portable electronic device with computing and wireless communication capability and a remote computer system. As used herein a cell phone, cellular phone, smart phone or mobile phone refers to an electronic device used for full duplex two-way radio telecommunications over a cellular network of base stations. In addition to being a telephone, a smart phone as contemplated herein supports additional functions and services. A smart phone is merely one type of mobile computing device with which the invention may be used.

The smart phone receives and stores barcode data, such coupon data, from the computer system. Optionally, an application referred to as a coupon management application is executable on the smart phone and enables management of the received and stored coupon data and interfacing to one or more services that supply coupon data to the smart phone. Though such an application may be advantageous, it is not required on any device able to download, select and play audio files. Any such device is capable of managing audio files for coupons according to the invention. The smart phone supplies the received coupon data to the synthetic barcode module. The coupon data includes barcode data for generating a synthetic barcode. The synthetic barcode module discriminates light pulses received from a barcode scanner from light received from other sources such as ambient light sources. When the synthetic barcode module detects a scanner, it emits light pulses that simulate light reflected from a barcode corresponding to the coupon data received from the smart phone. The scanner interprets the light pulses as light reflected from a barcode corresponding to the coupon.

A coupon management method according to principles of the invention includes steps of providing a synthetic barcode module; receiving, on a smart phone, coupon data from a coupon data source, which may be a remote computer system configured to deliver coupon data; interfacing the synthetic barcode module to the smart phone; using the synthetic barcode module, receiving light emitted from a laser barcode scanner; generating a signal from the light received from the external light source using the LED; conditioning the signal from the light received from the external light source to improve signal to noise ratio; determining if the signal corresponds to light received from a barcode scanner; and, if the signal corresponds to light received from a barcode scanner, then generating optical output using the synthetic barcode module, said optical output corresponding top coupon data and simulating light reflected from a barcode for the coupon data.

An exemplary synthetic barcode module according to principles of the invention includes light emitters that produce output signals corresponding to received light pulses, emits light pulses that emulate light reflected from a scanned barcode in scan mode. The light emitters includes an LED operating as an optical emitter. A controller receives and stores at least one code corresponding to at least one coupon data field, receives output signals corresponding to received light pulses, determines if the received light pulses correspond to a barcode scanner, and outputs driver signals to cause the light management module to emit light pulses that emulate light reflected from a scanned barcode to communicate the at least one coupon code optically to the barcode scanner. The synthetic barcode module may be integrated with the mobile computing device. If received light pulses correspond to a barcode scanner, as determined by checking stimulus timing, then synthetic barcode (e.g., coupon code) output is produced. The coupon code corresponds to a barcode of a coupon.

In another embodiment, the mobile computing device is a cellular telephone (such as a smart phone) configured to receive coupon codes in the form of audio files from a remote source via wireless cellular communication. A client application executable on the mobile computing device manages user selection and use of each coupon code, controls transmission of each coupon code from the mobile computing device to the coupon synthetic barcode module via the audio interface by playing the audio files. A plurality of coupon codes may be stored in a queue on the mobile computing device, with the client application providing a function for a user to control sending a next coupon code in the queue from the cellular telephone to the module. Alternatively, the client application working with a microphone in the mobile computing device may detect an audible signal corresponding to a successful scan. Upon such detection, the next coupon code in the queue would be sent. The client application also provides a search tool configured to search for available coupon codes from one or more remote source.

In another exemplary embodiment, no intelligent host is needed. The synthetic barcode module could be programmed with new coupon codes through an audio output jack from any device that reproduces (i.e., plays) sound. Such devices may include TV and radio receivers. In this instance, an advertiser would instruct the user to plug their unit into the earphone jack, or to place the device's microphone in close proximity to the speaker, to have their module programmed with the advertised coupon code(s). Coupon codes could also be distributed on iTunes or any internet service that enables someone to download audio files.

BRIEF DESCRIPTION OF THE DRAWINGS

The foregoing and other aspects, objects, features and advantages of the invention will become better understood with reference to the following description, appended claims, and accompanying drawings, where:

Figure 1:
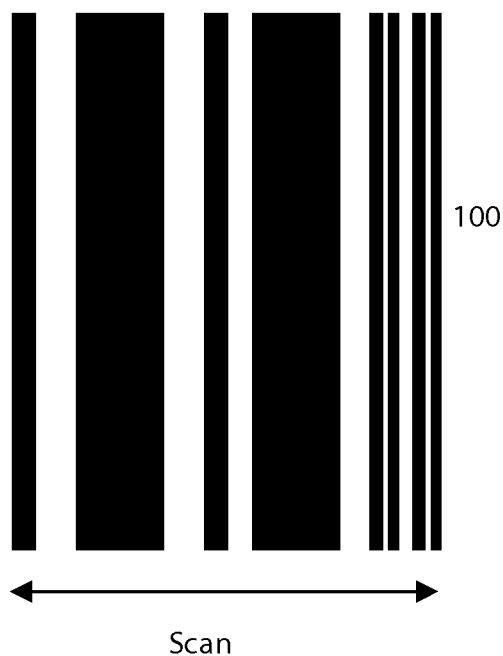
FIG. 1 provides a schematic diagram that conceptually illustrates principles of an exemplary synthetic barcode process according to principles of the invention.

Those skilled in the art will appreciate that the figures illustrate one or more exemplary embodiments and are not intended to be drawn to any particular scale; nor are the figures intended to illustrate every embodiment of the invention. Flowcharts illustrate exemplary processes, which may include fewer, additional or different steps, and in different orders, and yet remain within the scope of the invention. Block diagrams illustrate exemplary systems, which may include fewer, additional or different components, and in different configurations, and yet remain within the scope of the invention. Thus, the invention is not limited to the exemplary embodiments depicted in the figures or the particular circuitry, components, applications, or ornamental aspects, steps, configurations or arrangements shown in the figures.

DETAILED DESCRIPTION

A synthetic barcode module, system and method that utilize a reliable, adaptable, and cost effective audio-optical electronic synthetic barcode device, which obviates printed barcodes, is provided. The device is capable of detecting the presence of a conventional laser barcode scanner and capable of communicating barcode information, such as coupon information, in a form readable by a detected conventional laser barcode scanner. In a preferred embodiment, the device is integrated with a smartphone. Barcode information is communicated to the device as audio output from an electronic device equipped with an audio output jack. The system is compatible with network communication, allowing real-time monitoring and updating.

As used herein a coupon broadly denotes any medium that includes scannable information that is relevant to a transaction. The scannable information is information that is readable by a barcode scanner. By way of example and not limitation, a coupon may comprise a ticket, document or voucher that can be exchanged for a financial discount, credit, rebate, rewards, points or other consideration when purchasing a product or service. Customarily, coupons may be issued by manufacturers, wholesalers, distributors or retailers, to be used in retail stores or other establishments as a part of sales promotions. Another type of coupon within the scope of the invention is a welfare coupon, intended to help low income individuals satisfy their nourishment needs. Yet another type of coupon is a preferred customer card, which entitles the registered holder to financial discounts, credits, rebates, rewards, points or other benefits for purchases.

A key component of the system is a synthetic barcode module configured to emit light that emulates light reflected from a scanned barcode associated with a coupon based upon an audio file. Uniquely, an exemplary module employs one or more pixels or LEDs of a display screen to emit light that emulates light reflected from a scanned barcode. For convenience of reference, the light emitter is referred to herein as an LED, even though it may comprise a plurality of LEDs or one or more pixels of an AMOLED display.

A module according to principles of the invention may be integrated with a cellular telephone. A smart phone is merely one type of mobile computing device with which the invention may be used. By way of example and not limitation, a smart phone as contemplated herein is configured to store and process coupon data and communicate data signals to a coupon synthetic barcode module as described herein. Components of an exemplary smart phone with which the invention may be used include a rechargeable battery and power management circuit providing a power source and power management functions; an input mechanism and display to allow the user to interact with the phone such as a keypad or touch screen; memory for data storage such as nonvolatile RAM; a processor comprising a central processing unit to handle various commands and functions and data processing; analog-to-digital and digital-to-analog converters to translate the outgoing audio signal from analog to digital and the incoming signal from digital back to analog; and a radio frequency (RF) transceiver to amplify, encode, decode, receive and transmit RF signals.

Alternatively, a module according to principles of the invention may be an integral part of a mobile computing device such as a cellular telephone. In such an embodiment, the module is still configured to interface with and be controlled by the mobile computing device.

The smart phone may receive and store data in the form of audio files corresponding to coupons. As used herein, an audio file broadly refers to any file or data stream for storing or communicating digital audio data on a computer system. This data can be stored uncompressed, or compressed to reduce the file size. It can be a raw bitstream, but it may be in a container format or an audio data format with a defined storage layer. By way of example and not limitation, uncompressed audio data may be stored using pulse code modulation (PCM), such as in a .wav file on Windows or in a .aiff file on Mac OS. The AIFF format is based on the Interchange File Format (IFF). The WAV format is based on the Resource Interchange File Format (RIFF), which is similar to IFF. WAV and AIFF are flexible file formats designed to store more or less any combination of sampling rates or bitrates.

In a preferred embodiment, the audio file encodes a series of tones. When played using a media player application, the audio file causes the device (e.g., smart phone) to generate the series of tones. Each tone may be at one of two frequencies, representing either a digital zero or a digital one. By way of example and not limitation, a digital zero may be represented by a 1200 Hz tone, while a digital one may be represented by a 2200 Hz tone. A numerical designation for a barcode may be represented in binary notation, using digital ones and zeros. Start bits and stop bits may also be represented using digital ones and zeros. When the audio file is played by a media player, analog audio signals corresponding to the series of tones, which represent a barcode, and any additional data such as start and stop bits, are emitted through the audio output jack. As described in more detail below, the synthetic barcode module receives and converts the analog signals back into a serial bit stream comprised of digital ones and zeros.

When prompted by a user, a client application executed on the cellular telephone plays an audio file that corresponds to a coupon. The audio is decoded by the module into optical driver signals. The module emits light pulses from the driver signals. Light emitted from the module corresponds to a barcode, such as a coupon barcode. The barcode scanner interprets the emitted pulses of light as light reflected from a barcode, such as the barcode for a corresponding coupon. If there are several barcodes, the user may instruct the cellular telephone to play a series of audio files until each barcode has been played and used. Alternatively, the phone may be configured to automatically play the next audio file corresponding to the next coupon according to a time schedule or based upon detection (e.g., audible detection) of a positive scan. Thus, the invention provides an easy-to-use paperless wireless barcode on demand system that works with conventional laser barcode scanners.

Referring now to the Figures, in which like parts are indicated with the same reference numerals, various views of an exemplary compact, reliable, adaptable and inexpensive system and method for communicating coupon barcode data in a form readable by a conventional laser barcode scanner are conceptually shown. For convenience of reference, an electronic assembly that decodes audio files to drive light emitting elements that emit light pulses that emulate light reflected from a determined barcode in accordance with principles of the invention is referred to herein as a synthetic barcode module.

Advantageously, a synthetic barcode module according to principles of the invention may supply an optical signal to a conventional barcode scanner, such as laser scanners in widespread use in retail and industrial establishments. The optical signal emulates light reflected from a determined barcode, such that the decoded output from the scanner is equivalent to the decoded output that would be produced by scanning the emulated printed barcode. Consequently, standard inventory universal product code (UPC) scanning technology may be employed without an actual barcode being displayed. Many conventional point of sale systems will require no modification or enhancement to accommodate a synthetic barcode module according to principles of the invention.

In an exemplary embodiment, the synthetic barcode module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode or barcode symbology comprising parallel lines. A typical barcode scanner uses a scanning beam, typically narrow band light in the visible spectrum such as red laser, but potentially any bandwidth of light in the visible or infrared spectra, to pass over a sequence of nonreflecting and reflecting bars, such as dark (e.g., black) bars and light (e.g., white) spaces comprising a conventional barcode. However, the invention is not limited to use with conventional black and white visible barcodes. Instead, any alternating photon reflecting and photon absorbing materials may be utilized to provide the desired light absorption and reflecting effect. Pigments tend to appear as the colors they are because they selectively reflect and absorb certain wavelengths of visible light. Certain pigments selected to reflect the color of light emitted by the light source may be utilized for the reflecting regions, while pigments selected to absorb the color of light emitted by the light source may be utilized for the reflecting regions. A pigment that reflects across the entire visible wavelength range (i.e., about 380-770 nanometers) appears as white. Black surfaces absorb these wavelengths. If some regions of this light are absorbed and others reflected, then the object is colored. For example, an object that absorbs all visible light except the region 400-450 nm appears blue, while another that reflects only 650-700 nm light has a red color. As further examples, chlorophyll pigments absorb blue and red light but transmit green accounting for the color of leaves. Carotenoid pigments absorb violet and blue but transmit yellow, orange, and red, accounting for the bright orange color of carrots and apricots, which are rich in carotene.

Figure 2:
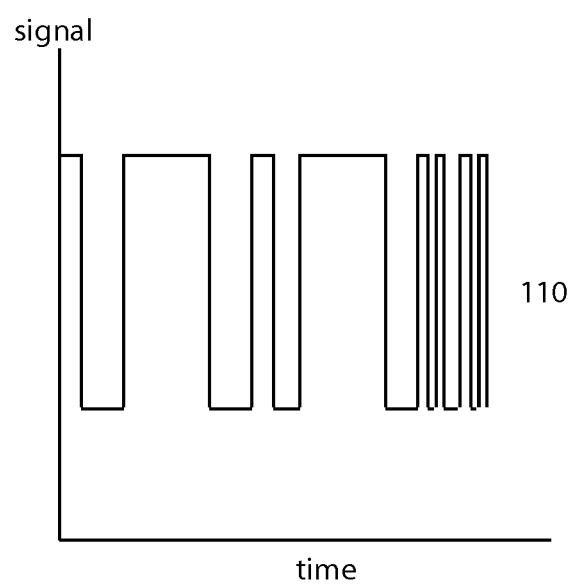
FIG. 2 provides a schematic diagram that conceptually illustrates principles of an exemplary synthetic barcode process according to principles of the invention.

Scanning may progress sequentially left to right and/or right to left. As the beam of light scans across a barcode, such as the barcode 100 shown in FIG. 1, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 110 in FIG. 2. The scanning speed and the width of each space and bar determine the duration of each electrical signal. The signals (including its duration) are decoded by the scanner or by an external processor into characters that the barcode represents.

Figure 3:
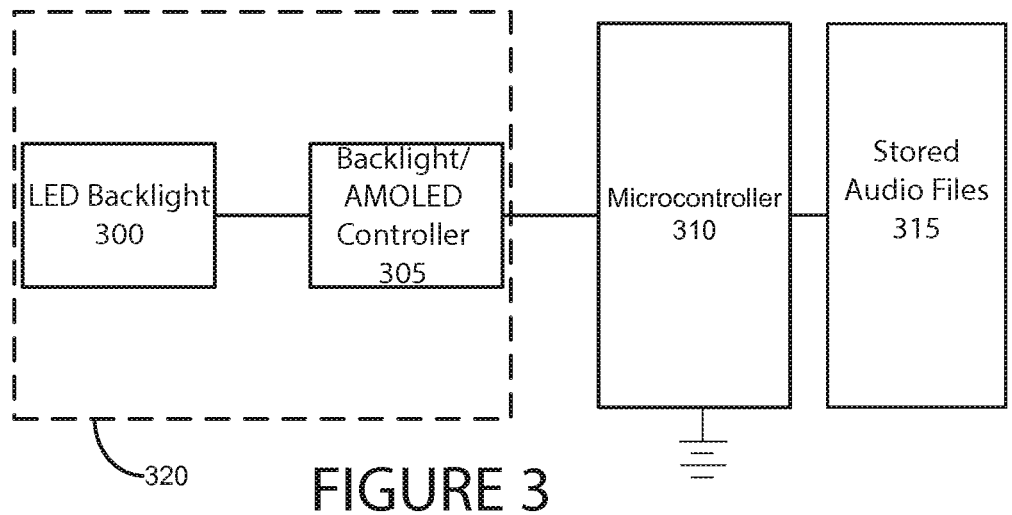
FIG. 3 provides a high level block diagram of components of an exemplary embodiment of a synthetic barcode module assembly according to principles of the invention.

As conceptually illustrated in FIG. 3, a first embodiment of an exemplary synthetic barcode module comprises components that are intended to be the target of the standard point of sale barcode scanners, such as those used at checkout lanes. An LED 300 serves as a light source. The LED 300 may be part of a backlight for an LCD or a part of an AMOLED display. More than one LED may be used.

The microcontroller 310 is a programmable integrated circuit comprised of a CPU with support features, such as an oscillator, timer, watchdog, and serial and analog I/O. Program memory, such as memory in the form of flash or ROM is included as well as a some RAM. The microcontroller 310 may include an analog to digital converter (ADC) to convert input analog voltage (or current) continuous signals to discrete digital data. The microcontroller 310 may also include a digital-to-analog converter (DAC) to perform the reverse operation for output signals. The microcontroller 310 is programmed to cause the controller 305 to energize the LED and transmit light pulses in a fashion to simulate the reflections from printed barcodes using the EAN-13, UPC-A, or other standard barcode systems, so that the emitted pulses can be read using a conventional barcode reader. The microcontroller 310 may be comprised of any suitable controlling device, such as a logic circuit, a microprocessor, a combination of these elements, and the like. Thus, the microcontroller may comprise a single integrated circuit or a combination of components typically included in smartphones.

The microcontroller 310 may have an internal clock oscillator as the time base for all operations. Alternatively, a crystal and associated circuitry may be utilized for a timing base. It may also have internal memory, which may store programming for the module and a table that determines the time and duration the LED 300 must be illuminated in order to generate light pulses comprising the synthetic barcode signal. Timing data for barcode synthesis may reside in the microcontroller 310 from manufacture or may be downloaded at some later point through any type of communications medium, e.g. RS232, RF data link, optical data link, etc.

The microcontroller decodes control signals from audio files 315 stored in the smart phone's memory or other storage. The microcontroller 310 sends control signals to the controller 305 to make the LED 300 turn on and off with sufficient brightness, and at the correct timing, for the emitted light to be interpreted by a standard laser barcode scanner as the signal from a printed barcode. By way of example and not limitation, the microcontroller 310 may modulate the light emission period by sending control signals to the controller 305.

In an exemplary embodiment, the microcontroller 310 causes the controller 305 to cause the LED 300 to emit light and cease emission for determined periods of time, according to a determined symbology. The symbology includes the encoding of the single digits/characters of the message as well as the start and stop markers into bars and space, the size of the quiet zone required to be before and after the barcode as well as the computation of a checksum. Illustratively, x millisecond periods (representing white spaces between bars) during which light is emitted and y millisecond periods (representing black bars) during which no light is emitted may be utilized to emulate light reflected from a barcode. The variable x may vary from a few milliseconds (e.g., 2 or 4 milliseconds) to multiples of that amount (e.g., 1, 2, 3 or 4 times that amount), depending upon the width of the space represented. Likewise, y may vary from a few milliseconds (e.g., 2 or 4 milliseconds) to multiples of that amount (e.g., 1, 2, 3 or 4) times that amount, depending upon the width of the bar represented. The timing works well across a wide range of barcode scanners. The barcode scanner interprets the emitted flashing light as an analog signal waveform of more or less rectangular-shaped pulses.

The LED 300 is a current-driven device whose brightness is proportional to its forward current. Forward current can be controlled either by applying a voltage source and using a ballast resistor or, preferably, by regulating LED current with a constant-current source, such as controller 305. The controller 305 supplies a correct amount of current to drive the LED 300. While a separate controller 305 is shown, the controller 305 could optionally be included or integrated into the microcontroller 310. The controller 305 eliminates changes in current due to variations in forward voltage, which translates into a constant LED brightness. Optionally, the controller 305 may enable Pulse Wave Modulation (PWM) dimming, which entails applying full current to the LED at a reduced duty cycle and at a high enough frequency (e.g., >100 Hz) to avoid pulsing that is visible to the human eye. In some embodiments, the controller 305 may be comprised of one or more pins on the microcontroller 310 with a current limiting resistor. A switched current source or current sink may also be used to drive the LED 300.

The microcontroller 310 receives and demodulates audio signals from audio files 315, producing digital output that can drive the controller 305. In a particular preferred embodiment, the audio interface includes a frequency shift keying (FSK) receiver 330 (or transceiver), which is signal processing circuitry that receives the analog audio input and generates binary data output. The binary data comprises the zeros and ones modulated in the analog audio signal. This data stream may include error detection and/or correction codes. The FSK receiver 330 may comprise discrete circuitry, an integrated circuit and/or an integral functional component of the microcontroller 310.

Tone detection may be accomplished using a fast Fourier transform (FFT) or the Goertzel algorithm. Using an FFT or Goertzel algorithm, the system may determine whether a tone (or tone pair) of a particular frequency is present in an audio stream.

In operation when a laser barcode scanner hits the LED 300, the signal conditioning circuit 305 communicates filtered and amplified signals to the microcontroller 310, which causes the controller 305 to drive the LED 300 in a manner that emits a predefined series of light flashes corresponding to light reflected to a scanner upon scanning a barcode. When that series of light flashes has been sent, the system module waits for another hit from a scanning laser beam to repeat the process. The timing of the transmitted light pulses may be pre-programmed in the microcontroller 310.

The synthetic barcode module sequentially communicates barcode data via a communication path (e.g., optical communication path). Thus, barcode data corresponding to coupons may be communicated via an optical communication path using the synthetic barcode module.

Figure 4:
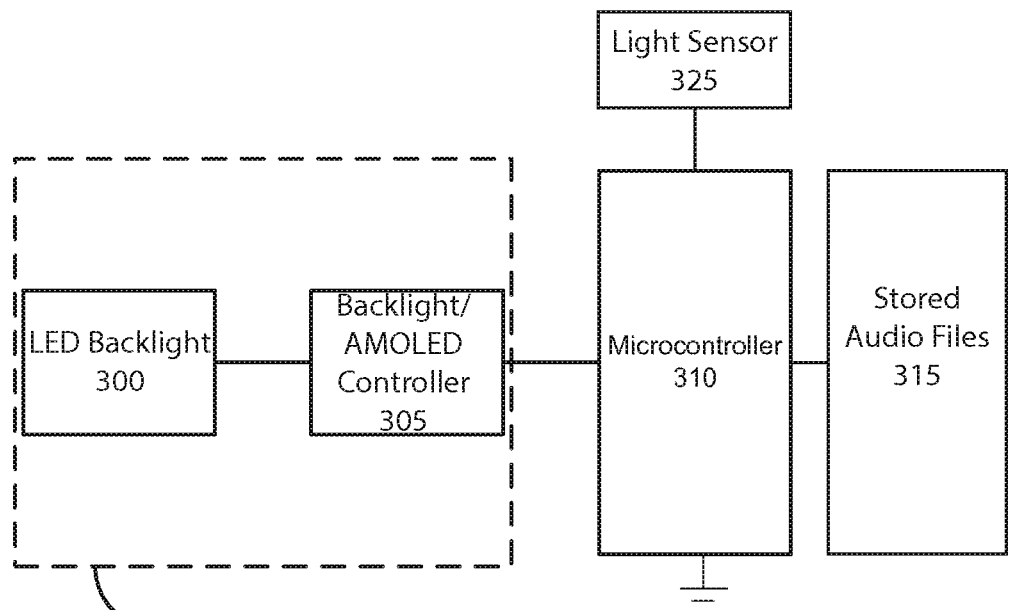
FIG. 4 provides a high level block diagram of components of another exemplary embodiment of a synthetic barcode module assembly according to principles of the invention.

As shown in FIG. 4, a photo receiver (i.e., light sensor) 325 may optionally be utilized. The photo receiver 325 may be comprised of any compatible photo detector capable of sensing electromagnetic energy in the visible and/or infrared parts of the spectrum, as emitted by a barcode scanner. Nonlimiting examples of suitable photo receivers include photoresistors which change resistance according to light intensity, photovoltaic cells which produce a voltage and supply an electric current when illuminated, photodiodes which can operate in photovoltaic mode or photoconductive mode converting light into either current or voltage, and phototransistors incorporating one of the above sensing methods. Many smartphones are equipped with an ambient light sensor for boosting brightness levels in dark environments. Additionally, a charge-coupled device (CCD) or complementary metal-oxide-semiconductor (CMOS) of a camera may operate as a light sensor 325. Any of the foregoing may be adapted to function as a light sensor.

Visible light ranges from 400 nm (violet/blue) to 700 nm (deep red). Wavelengths above 700 nm and up to about 5000 nm are known as near infrared. The CCD and CMOS sensors used in digital cameras today are sensitive to light with wavelengths up to around 1000 nm. However, for standard photography, capturing infrared light is not desirable, so the manufacturers put an IR-blocking filter in front of the camera's sensor. A typical IR-blocking filter limits the sensitivity of an unmodified camera to wavelengths below 700-705 nm. An HeNe laser found in older laser barcode scanners and a laser diode used in modern barcode scanners have an operation wavelength ($\lambda$) of about 630 to 650 nm, in the red portion of the visible spectrum. These wavelengths are well within the sensitivity of many CCD and CMOS sensors, even those equipped with an IR-blocking filter.

In the embodiment that employs a sensor 325 as illustrated in FIG. 4, the synthetic barcode module senses the presence of a laser scanner by detecting output corresponding to 630 to 650 nm light. When the scanner is detected, the synthetic barcode module responds by emitting the pulses of light to emulate a barcode. In this manner, such flashing is avoided unless a scanner is present. As the flashing occupies at least a portion of the display, it is desirable to limit the flashing until a scanner is present. In the embodiment of FIG. 3, a user may initiate emission of barcode signals by entering a command. In the embodiment of FIG. 4, emission may commence when the phone is in the presence of a detected scanner.

Each embodiment shown in FIGS. 3 and 4 includes a controller 305. The LED 300 is operably coupled to the controller 305. The synthetic barcode circuit 405 of the embodiment shown in FIG. 4 includes the LED 300 operably coupled to the controller 305 and a photo receiver 325 operably coupled to the microcontroller 310. In that embodiment, the photo receiver 325 functions as an optical-to-electrical transducer. Thus, the difference between the two embodiments is that the photo receiver 325 is configured to sense optical input in the embodiment shown in FIG. 4, while the embodiment shown in FIG. 3 does not require such a sensor.

In one embodiment, a synthetic barcode module according to principles of the invention is integrated into a display, such as a backlit liquid-crystal display (LCD) or an active matrix organic light emitting diode (AMOLED) display. In either display, one or more LEDs is selectively illuminated to produce a synthetic barcode output as described above.

Figure 5:
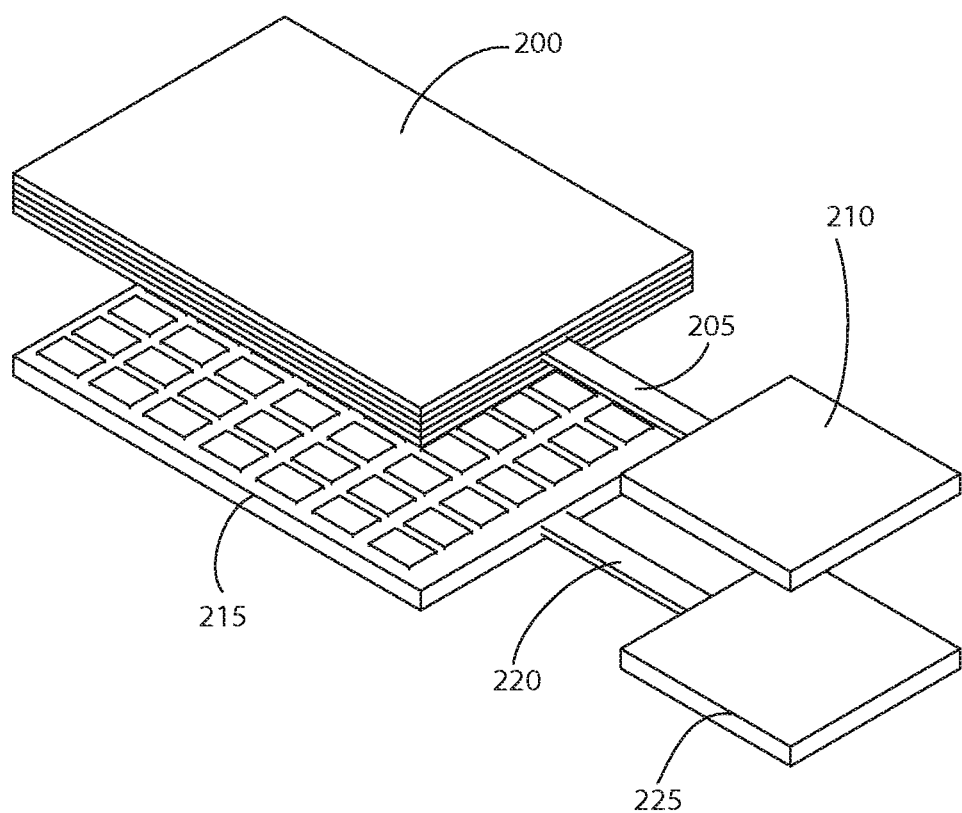
FIG. 5 provides a perspective view that conceptually illustrates components of an exemplary synthetic barcode module according to principles of the invention.

With reference to FIG. 5, an LCD 200, which uses the light modulating properties of liquid crystals, does not emit light directly. Instead, LCD displays, such as the LCD 200 conceptually illustrated in FIG. 5, require external light to produce a visible image. In a "transmissive" type of LCD, this light is provided at the back of the LCD glass "stack" 200 and is called the backlight 215. By way of example and not limitation, an LCD stack 200 may comprise a combination of glass polarizers (e.g., polarizing films), a liquid crystal layer, and a TFT matrix of thin film transistors and capacitors, with the TFT matrix and liquid crystal being sandwiched between the glass filters. A controller 210 is operably coupled to the TFT matrix of the stack 200 by cable(s) 205 or other conductive paths. The LCD controller 210 formats and scales the many types of computer and video signals so as to drive the TFT matrix of the LCD stack 200.

The LCD backlight 215 is behind the stack 200. Of particular relevance for the subject invention are LCD displays having LED active matrix backlights, particularly an RGB LED matrix. In such a display, an array of LEDs 215 behind the stack 200 includes rows (horizontal) and columns (vertical) of LEDs which provide the backlight. A backlight controller 225 coupled to the LED matrix by cable(s) 220 or other conductive paths controls LED illumination by providing regulated current to drive the LEDs. The backlight controller 225 may selectively illuminate any LED, in any primary color or combinations of RGB colors, and control brightness using pulse width modulation. In this embodiment, the microcontroller 310 causes the backlight controller 225 to controllably flash one or more LEDs of the active matrix 215, at a preferred color, while the microcontroller 310 causes the LCD controller 210 to maintain LCD at the illuminated LEDs in a transmissive state (e.g., transparent state) allowing the backlight to pass through the stack 200. The illumination and controlled flashing occurs in a manner to emulate reflectance of a scanned barcode, as described herein.

Figure 6:
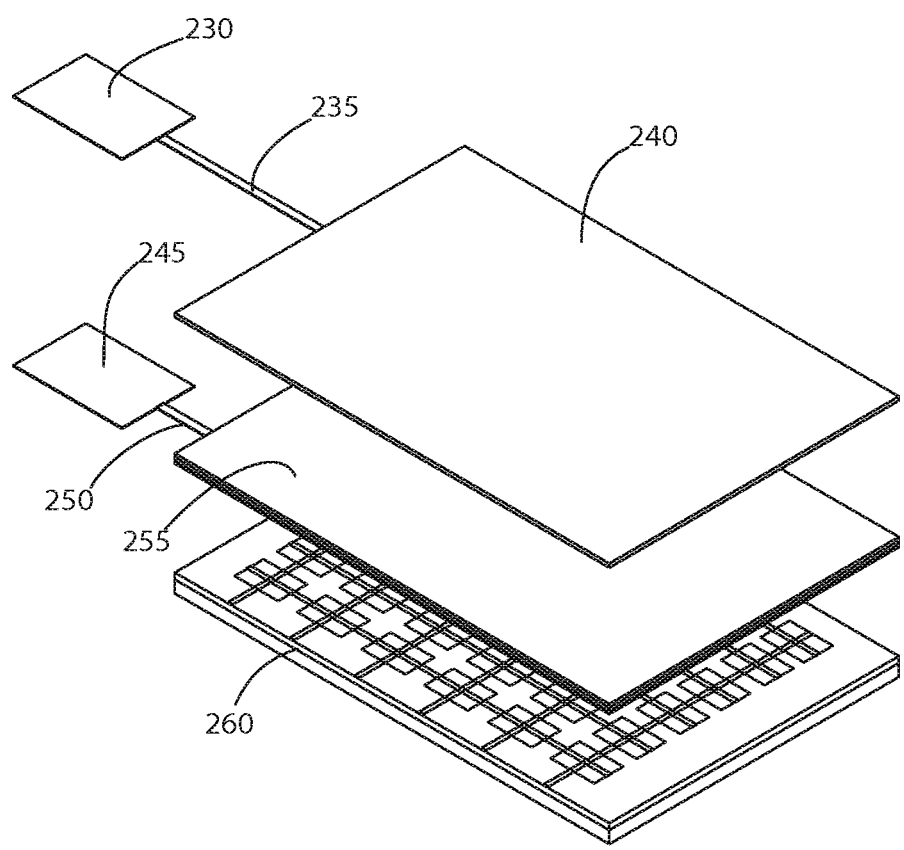
FIG. 6 provides another perspective view that conceptually illustrates components of an exemplary synthetic barcode module according to principles of the invention.

With reference now to FIG. 6, an AMOLED display is comprised of an active matrix of OLED pixels that generate light (luminescence) upon electrical activation. The AMOLED is made from layers of organic compounds 255 that emit light when electricity is applied. The organic active layers 255 are disposed between a cathode layer 240 and a TFT array 260. A cathode regulator 230 is operably coupled to the cathode layer 240 via cable(s) 235 or other conductive paths. The organic active layers 255 may be deposited or otherwise integrated onto the thin-film-transistor (TFT) array 260, which functions as a series of switches to control the current flowing to each individual pixel. A TFT controller 245 is operably coupled to the TFT layer 260 via cable(s) 250 or other conductive paths. A continuous current flow is controlled by at least two TFTs at each pixel (to trigger the luminescence), with one TFT to start and stop the charging of a storage capacitor and the second to provide a voltage source at the level needed to create a constant current to the pixel. In this embodiment, the microcontroller 310 causes the TFT controller 250 and cathode regulator 230 to controllably activate transistors of the TFT matrix 260 and cathode layer 240, to illuminate pixels at a preferred color, while the microcontroller 310 causes the TFT controller 250. Illumination and controlled flashing of the pixels occur in a manner to emulate reflectance of a scanned barcode, as described herein.

Figure 7:
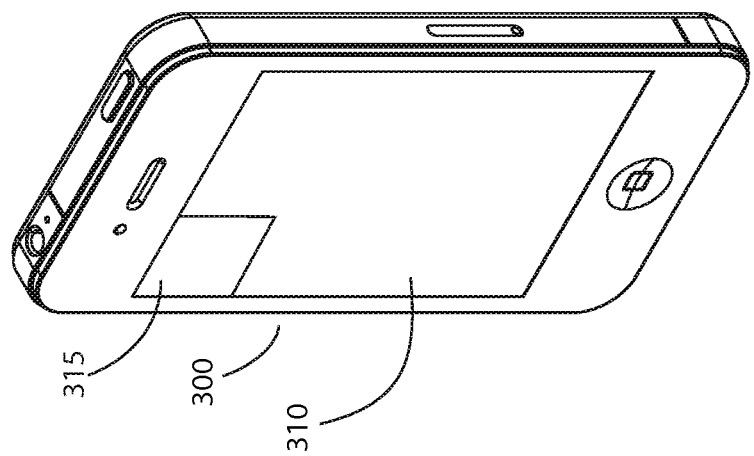
FIG. 7 provides a perspective view that conceptually illustrates a cellular phone equipped with an exemplary synthetic barcode module according to principles of the invention.
Figure 8:
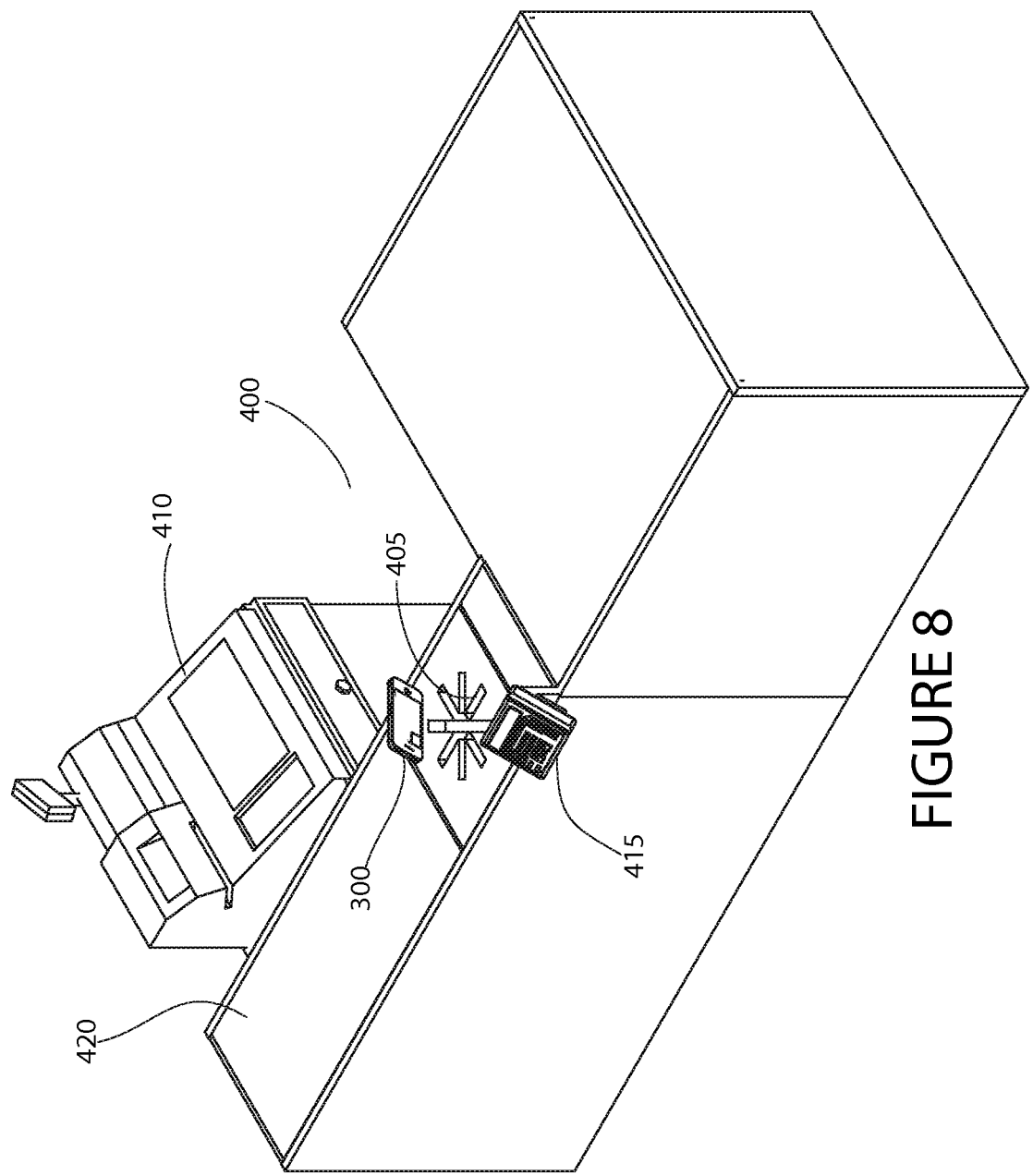
FIG. 8 provides a perspective view that conceptually illustrates a cellular phone equipped with an exemplary synthetic barcode module at a point of sale according to principles of the invention.

Referring now to FIG. 7, an exemplary smart phone 300 according to principles of the invention includes a display 310, such as an AMOLED or active matrix RGB LCD, with a portion of the display 315 controllably illuminated to generate synthetic barcode output. The phone 300 is shown in use at a point of sale 400 (checkout lane) in FIG. 8. The point of sale 400 includes a laser scanner 405, over which the phone is positioned. The scanner 405 is a conventional fixed laser barcode scanner commonly used at grocery checkout lanes. However, the invention is not limited to such scanners. Rather the invention works with other scanners that respond to light reflected from a barcode, such as handheld scanner guns and the like. The scanner will interpret the light pulses from the display of the phone 300 as a scanned barcode. Additional accessories at the point of sale are a register 410 and card reader 415.

The phone 300 stores data corresponding to coupons. The coupon data may be uploaded to the phone 300 wirelessly on demand from any remote source. Alternatively, the coupon data may be uploaded to the phone from a paired personal computer during synchronization. The manner in which the coupon data is provided to the phone 300 is not particularly important. Any method of supplying data in the form of audio files to the smart phone 300, may be utilized.

A client application executable on the phone 300 facilitates storage, selection and transmission of coupon data. As discussed above, the client application may take the form of a media player, particularly an audio player, which is a software application for playing the audio files. In a particular preferred embodiment, the application includes a media library containing image files (e.g., thumbnails) and data corresponding to each audio file. The media player application displays information (e.g., thumbnails and text) associated with each audio file in a media library. The application may allow a user to organize and sort the audio files, such as by product category, expiration and amount. In a coupon embodiment, where the audio files correspond to coupons, then during checkout, a consumer using the application may review the stored coupon data and select coupons corresponding to purchased items. The selection may be made using the phone's 300 user interface.

At the appropriate time in the checkout process, the consumer may instruct phone 300 to emit synthetic barcodes corresponding to the selected coupons. In response, the phone 300 demodulates barcode data from audio files corresponding to the barcodes. The signals are used by the microcontroller (e.g., microprocessor) of the phone drive the display controller in a manner to produce the synthetic barcode output. Light emitted from the display corresponds to a coupon barcode. The barcode scanner 405 interprets the emitted pulses of light as light reflected from a barcode for the corresponding coupon.

If there are several coupons, the user may instruct the cellular telephone 300 to produce a synthetic barcode for the next coupon after a coupon has been read by the barcode scanner. Most barcode scanners provide a signal (e.g., an audible) beep to signify a successful read. Many scanners emit a distinctive beep (e.g., a 4 kHz 100 ms beep) that may be audibly detected by the phone 300 to indicate a successful scan. Upon sensing a beep indicative of a positive read, the phone may proceed with the next transmission. A microphone on the phone 300 may be used to detect the distinctive beep, to automatically advance to the next coupon. This sequence of steps may be repeated until each coupon has been used. The phone 300 may be configured to automatically emit pulses corresponding to the next coupon according to a time schedule (e.g., 5 seconds apart) or based upon detection (e.g., audible detection) of a positive scan.

In sum, the invention provides an easy-to-use paperless wireless coupon on demand system that works with conventional laser barcode scanners. Coupons may be wirelessly retrieved, selected, and optically transmitted at any checkout lane equipped with a laser scanner.

Those skilled in the art will appreciate that a synthetic barcode coupon system and method according to principles of the invention may be utilized in many different industries, i.e., anywhere information is communicated to a laser barcode scanner. By way of example and not limitation a synthetic barcode module according to principles of the invention, because of its compact configuration, may be applied to any transaction or event requiring a barcode readable by a laser scanner.

An inherent advantage is that the primary readout technology (i.e., a barcode scanner) is ubiquitous and inexpensive. Another advantage is that the input interface and form of analog input is widely available. Yet another advantage is that the encoded information (e.g., coupon barcode data) is communicated optically. Yet another advantage is that the information may be updated and replaced using communication capabilities of the phone. Still another advantage is that vast amounts of data may be stored on the phone. Furthermore, because of its compact configuration, a synthetic barcode module may be integrated with a phone and carried by a user at all times. Moreover, the total cost of ownership of such modules can be relatively low because the hardware components (e.g., an LED, a signal conditioner, a microcontroller and an LED driver) are all inexpensive and widely available in existing phones.

Figure 9:
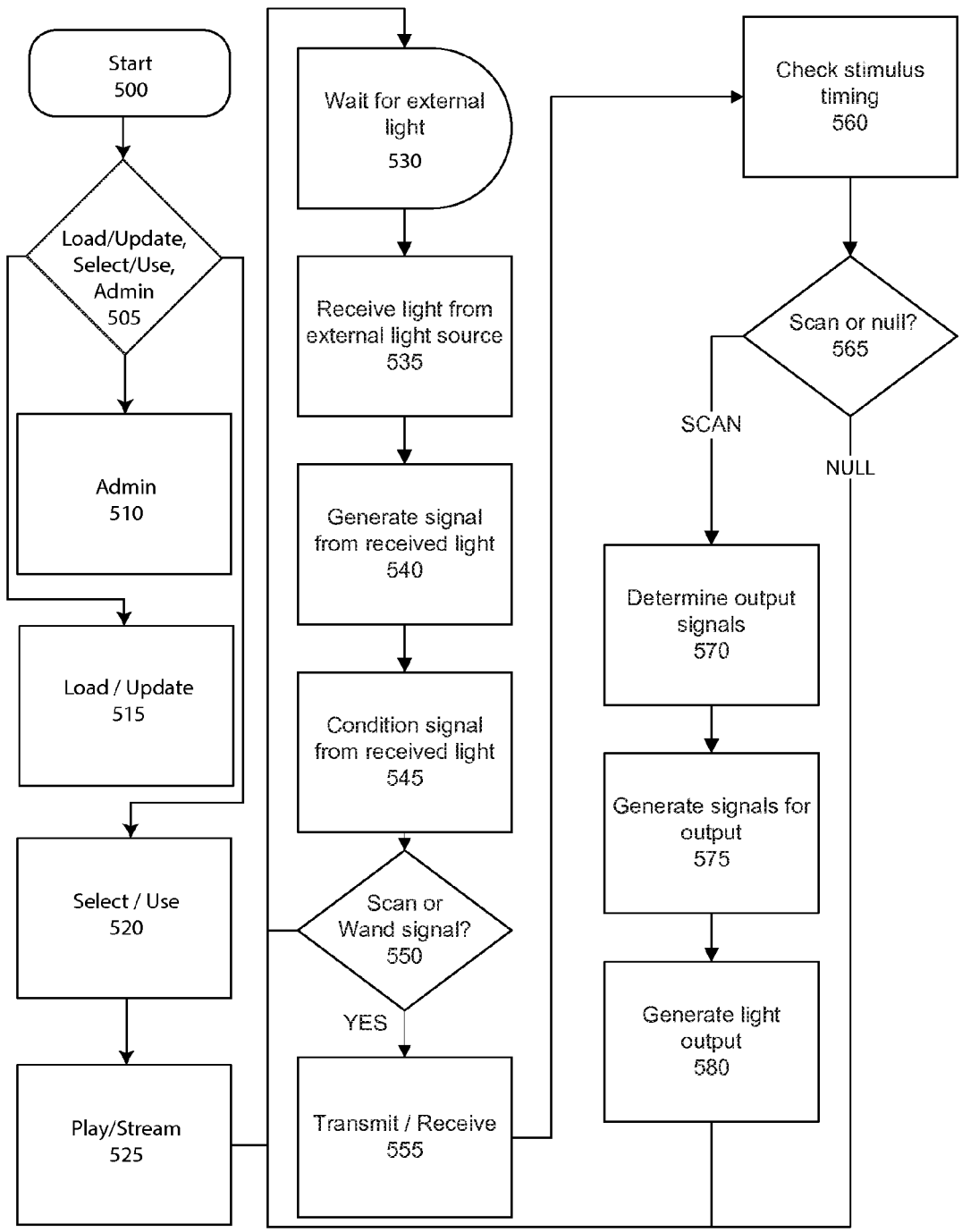
FIG. 9 provides a high level flowchart that conceptually illustrates steps of an exemplary synthetic barcode method according to principles of the invention.
Figure 13:
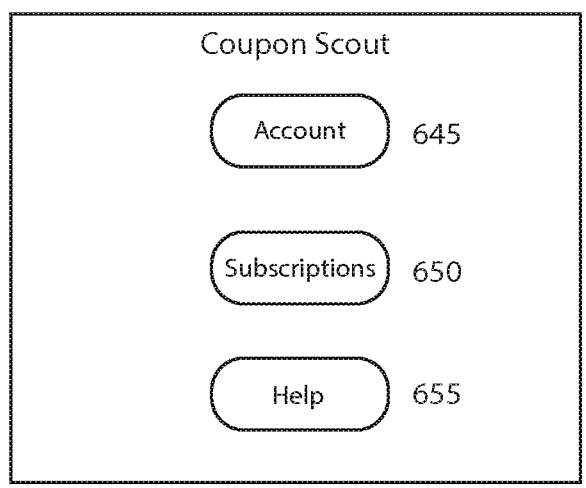
FIG. 13 is a schematic diagram that conceptually illustrates another aspect of a graphical user interface for an exemplary synthetic barcode coupon client application according to principles of the invention.

Referring now to FIG. 9, a high level flowchart of steps of an exemplary synthetic barcode method according to principles of the invention is conceptually shown. The method starts in step 500 by launching a client application, such as an application on a mobile phone, and providing instructions via a user interface in step 505. Upon launching the application, a user is presented with a user interface as conceptually illustrated in FIG. 10. User selectable commands include Load/Update 600, Select/Use 605 and Admin 610. One type of command is Admin 610 for administration 510. Upon receiving an administration instruction, the application provides controls for account management (e.g., setting user passwords) 645, subscription information 650 and help and setting program preferences 655, as shown in FIG. 13.

Account management functions include settings and parameters related to a user's account. By way of example, controls for changing passwords and user names associated with the application and an account may be provided.

Subscription functions allow a user to identify manufacturers, products, and/or remote online sources for which or from which coupon data is collected. By way of example and not limitation, a user may subscribe to all coupons from a manufacturer of breakfast cereal, or the user may subscribe to coupons from the manufacturer for a particular breakfast cereal. The application will either directly find and retrieve coupon data corresponding to the subscriptions or will receive data streams from a remote application running on a web server. A search function may also be provided to enable a user to search for a source of coupons for a particular type of product or a particular brand of product. A browse function may provide a menu that enables a user to browse for coupons according to product and/or manufacturer and/or brand categories. For example, a user may browse for coupons for cereals, coupons for products manufactured by a particular cereal manufacturer or coupons for a particular brand of cereal.

Help/program preferences relate to the user interface and data storage aspects of the application. One preference may be where to store coupon data on the mobile phone. Another preference may be a limit on storage, such as a maximum amount of coupon data that may be stored and/or a maximum amount of time to maintain coupon data stored on the phone. Other preferences may include configuration of audible signals. Yet other preferences may include set up of parameters for communication with remote sources of coupon data.

Figure 10:
FIG. 10 is a schematic diagram that conceptually illustrates an aspect of a graphical user interface for an exemplary synthetic barcode coupon client application according to principles of the invention.
Figure 11:
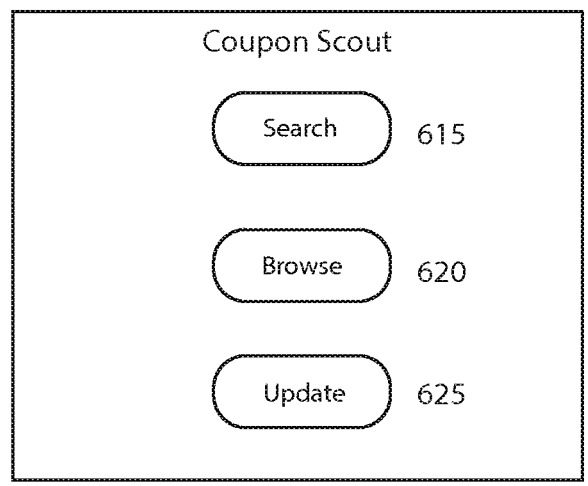
FIG. 11 is a schematic diagram that conceptually illustrates another aspect of a graphical user interface for an exemplary synthetic barcode coupon client application according to principles of the invention.

After completion of administration functions control passes back to the start 500. A user may load/update coupon data as in step 515 by selecting the load/update command 600 (FIG. 10). Load/update functions include search 615, browse 620 and update 625 (FIG. 11). Search 615 allows a user to search for and select and/or subscribe to coupons using keywords. Browse 620 allows a user to browse for and select and/or subscribe to available coupons according to product type, manufacturer and/or brand. Update 625 allows a user to request any updated coupon data for the products, manufacturers, and brands to which the user subscribed. The coupon data may be communicated via and means of communication compatible with the phone 300.

Figure 12:
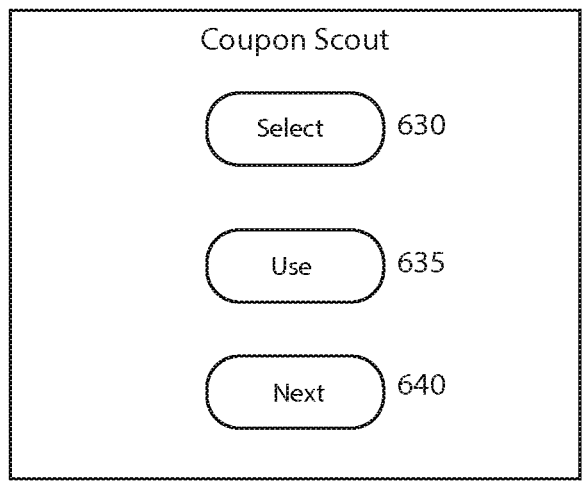
FIG. 12 is a schematic diagram that conceptually illustrates another aspect of a graphical user interface for an exemplary synthetic barcode coupon client application according to principles of the invention.

After completion of the load/update functions control passes back to the start 500. A user may select and use available coupon data as in step 520 by selecting the select/use command 605 (FIG. 10). The select and use functions include a select command 630 that places selected available coupon data in a queue for transmission to the module of the phone 300 (FIG. 12). The use command 635 begins the transmission process, at which time the synthetic barcode optical flashes are emitted. The next command 640 instructs the application to transmit the next coupon data from the queue.

Step 525 entails playing an audio file corresponding to a barcode. Playing may be accomplished using any compatible media playing application or module. Upon being played, analog audio signals are output. The analog signals correspond to the barcode. The phone demodulates the analog signals and generates optical driver signals to optically emulate the barcode.

Steps 530 to 580 comprise steps of an exemplary transmission process. As an initial step, the module (i.e., the phone 300 equipped as described above), optionally, may wait to receive light from an external source, as in step 530. To conserve power, a system implementing the method may sit idle until light is received, i.e., until interrogated. Light is received from an external source, which may include laser light emanating from a barcode reader or ambient light emitted from other nearby light sources, as in step 535. The light may be collected by a light transmission means such as a light pipe, lens or mirror, and then transmitted to an optical sensor, which may be an LED used also as an emitter, a photodiode, a CCD, a CMOS camera, or some other photo receiver. Next, the sensor generates a signal corresponding to the received light, as in step 540. A signal conditioner receives and conditions the signal from the sensor by improving the signal to noise ratio and supplying logic level signals to a microcontroller, as in step 545.

The system discriminates between a scanning signal and a signal from another source of light. First, the system is configured to discriminate a signal corresponding to a laser pulse of a barcode scanner from signals generated by other light sources, such as ambient light, based upon signal characteristics, such as stimulus timing or voltage rise time, as in step 550. If the signal does not correspond to a signal from a scanner, then control returns to step 530. However, if a signal corresponds to a signal from a scanner, then control proceeds to subsequent steps. Optionally, the discrimination step comprises receiving light pulses as in step 555. In step 560, stimulus timing is checked. That entails determining if the signal being received has a regular or determined pulse rate. For example, laser scanners scan a laser beam back and forth across a bar code. The scanning rate is typically fixed at about 100 scans per second (or more) for a particular laser scanner. To the module, the scanning laser of a barcode scanner will appear as a light pulse recurring in regular fixed intervals of time (e.g., once every 0.01 seconds). Thus, light from a barcode scanner may be readily distinguished by determining if the light pulse is repeatedly detected at a fixed frequency (i.e., at a fixed amount of time between detected light pulses). If the light received does not correspond to a barcode scanner, then step 565 passes control back to step 530.

Based upon the stimulus timing, such as pulse rates or frequencies, a determination is made if the emitting unit is a barcode scanner or not as in step 565. For a scanner, control proceeds to scanning mode steps 570-580. In scan mode, the received light prompts the system to emit optical output for a scanner/reader to read. If the signal does not correspond to a signal from a scanner, then in "null mode" control returns to step 530. Null mode may be triggered due to any ambient or incompatible light source. Thus, unless and until signal characteristics correspond to a compatible scanner, the module will not communicate data.

In scan mode, a programmed microcontroller receives the conditioned signals and determines output signal stream(s), as in step 570. An LED driver receives the signals that are output from the microcontroller and supplies a correct amount and timing of drive current to an LED light source to emulate light reflected from a determined scanned barcode, as in step 575. The LED light source receives the drive current from the LED driver and emits light to emulate light reflected from a determined scanned barcode, as in step 580. Advantageously, in a particular exemplary embodiment of the invention, the device that emits the light in step 580 may be an LED and the same device (i.e., same LED) used to sense the light and generate a signal from the received light in steps 555. As another advantage, in another particular exemplary embodiment, one or more light pipes may facilitate the capture (i.e., receipt) and transmission of light from an external source, as in step 555.

Figure 14:
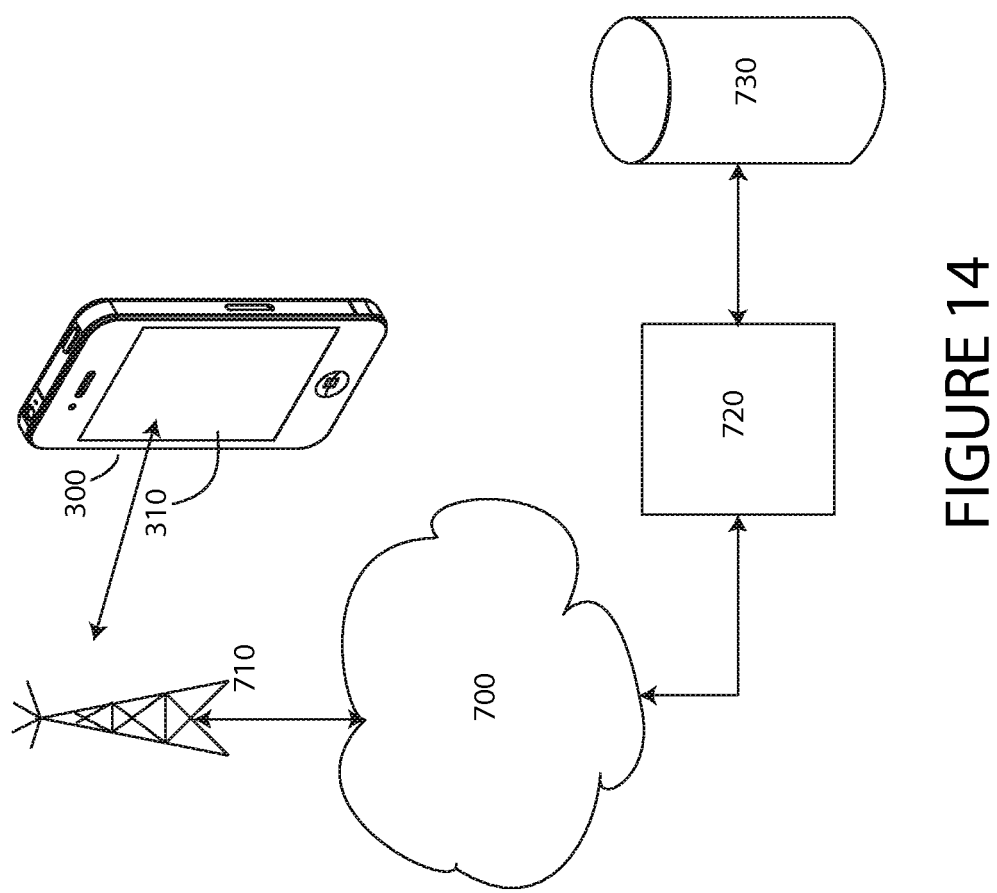
FIG. 14 provides a high-level block diagram that conceptually illustrates components of an exemplary synthetic barcode coupon system according to principles of the invention.

Referring now to FIG. 14, a high-level block diagram of a system in accordance with an exemplary implementation of the invention is shown. A server 720 hosts software for managing coupon data on a data store 730 and enabling such data to be communicated to various end user devices such as a cellular phone 300, equipped with a display 310. While FIG. 14 shows one server 720 and one end user device 300, it is understood that the system may include any number of servers and end user devices. Additionally, a server may comprise a standalone computer or a plurality of operably coupled computing devices. The invention is in not limited to the exemplary networked system shown in FIG. 14.

Coupon data may be communicated from the server 720 using any compatible communication means, such as network connection via a LAN, WAN or the Internet 700, RF communication such as cellular telephone communication 710, or other means of wired or wireless communication. In one embodiment, the data may be communicated to an end-user's personal computer, to which the end user's device (e.g., phone 300) may be synchronized, thus receiving the data. In another embodiment, the data may be communicated from the server 720 via the network to the end user device 300.

The server and personal computers described above may be comprised of commercially available computers, hardware and operating systems. Indeed, the aforementioned computing devices are intended to represent a broad category of computer systems capable of functioning in accordance with the present invention. Of course, the computing devices may include various components, peripherals and software applications provided they are compatible and capable of performing functions in accordance with the present invention. The computing devices also include information, documents, data and files needed to provide functionally and enable performance of methodologies in accordance with an exemplary embodiment of the invention.

A firewall may be located between computers to protect against corruption, loss, or misuse of data. The firewall may limit access and prevent corruption of sensitive data. Thus, a server may be configured/authorized to access and receive only data that is necessary for the legitimate functions of the server. The firewall may be comprised of any hardware and/or software suitably configured to provide limited or restricted access to a computer. The firewall may be integrated within the computer or comprise another system component, or may reside as a standalone component.

Figure 15:
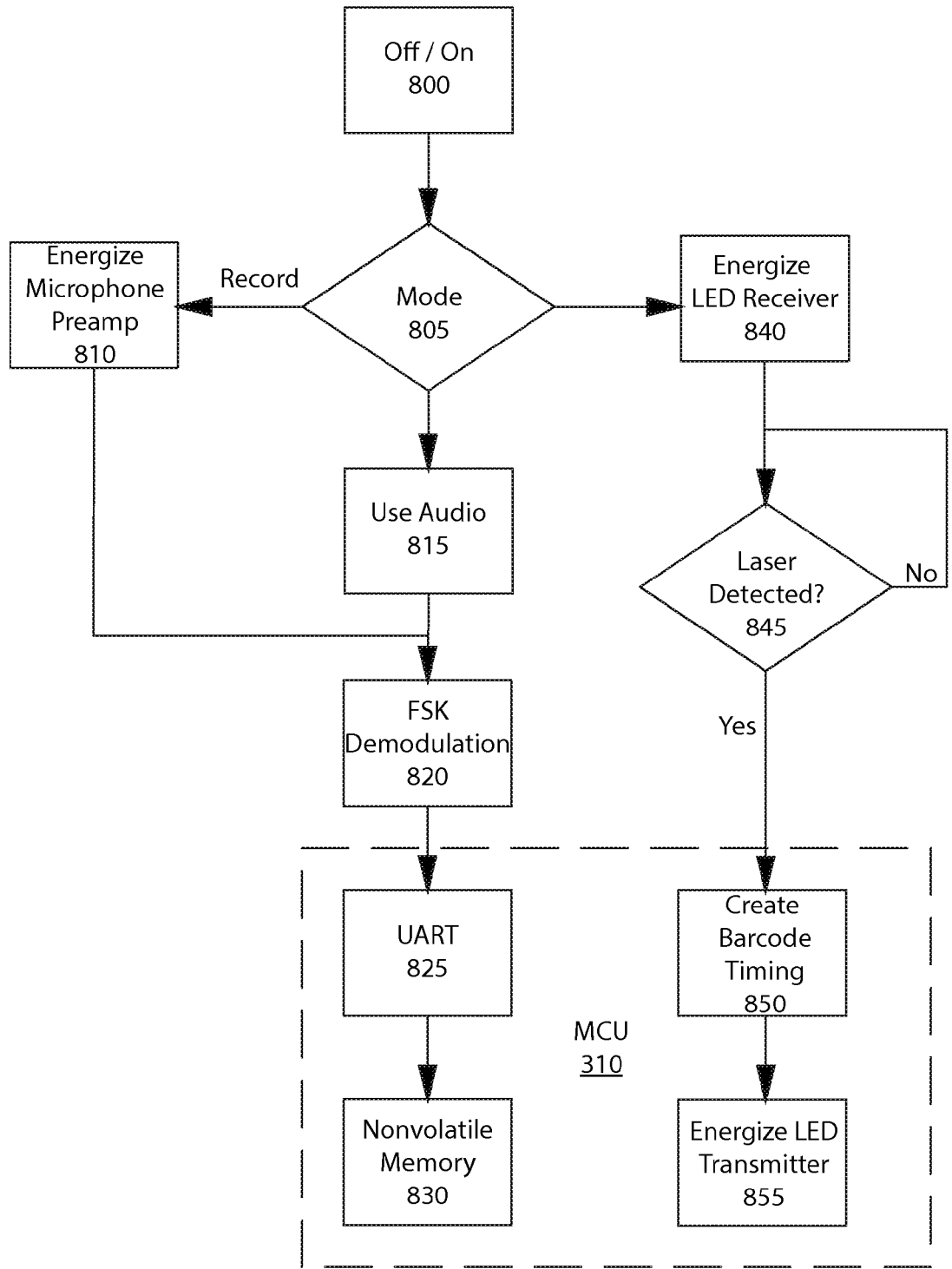
FIG. 15 is a high level flowchart that conceptually illustrates modes of operation of an exemplary synthetic barcode module according to principles of the invention.

Now referring to FIG. 15, a flow chart that conceptually illustrates modes of operation of a synthetic barcode module according to principles of the invention is provided. An input mode, steps 810-830, entails transforming analog audio input into optical output data. An output mode, steps 840-855, entails generating optical output based upon the optical data when a barcode scanner has been detected. In step 800, a synthetic barcode module according to principles of the invention is activated or awaken from sleep or hibernation mode. Activation or awakening may be accomplished by user selection of a switch (e.g., a power on switch) or sensing that the module has been plugged into an audio output jack of a compatible device. When the module is activated, steps of the input mode or output mode may proceed, as illustrated in step 805.

In input mode, analog audio input may be received from an energized microphone preamp, as in step 810, or from an audio output jack, as in step 815. In the case of microphone input 810, the synthetic barcode module or the compatible device (e.g., phone) may be equipped with a microphone and preamp circuitry. If the module is equipped with a microphone, the microphone may be communicatively coupled to the microcontroller. If the compatible device is equipped with a microphone, recorded output may be communicated to the module via the audio output jack. The analog audio input comprises modulated audio, such as, but not limited to, frequency modulated audio according to a frequency-shift keying (FSK) modulation scheme in which digital information is transmitted through discrete frequency changes of a carrier wave. The analog audio input is demodulated in step 820, such as by FSK demodulation or another demodulation methodology that is compatible with the modulated analog audio input. In step 825, a Universal Asynchronous Receiver/Transmitter (UART) assembles demodulated bits of data into complete bytes. The bytes of data constitute optical timing data. Many of the aforementioned components may be provided as part of one or more integrated circuits contained in the phone 300, or hardware or software equivalents thereof.

In output mode, a photo receiver (e.g., CCD, CMOS, light sensor) is used as a receiver, as in step 840. The module detects the presence of a laser scanner. By way of example, an HeNe laser found in older laser barcode scanners and a laser diode used in modern barcode scanners have an operation wavelength (λ) of about 830 to 850 nm, in the red portion of the visible spectrum. A Super High Brightness Red LED, which emits pure red to He—Ne laser red light, with a peak wavelength (λ) between 650 and 670 nm, may be sensitive to red light from such a laser barcode scanner. An infrared LED may be used to sense light emitted from and emulate light reflected to an IR barcode scanner. If sensed light is not light from a laser barcode scanner, control returns to step 845. If sensed light is light from a laser barcode scanner, the microcontroller supplies a correct amount and timing of drive current, as in step 850, to energize an LED light source, as in step 855, to emit light that emulates light reflected from a barcode.

The invention offers several advantages. One advantage of the invention is that the synthetic barcode module may communicate a wide range of data from an end user device such as a cellular phone to any compatible barcode scanner. Various sets of data may be stored and communicated sequentially. By way of example and not limitation, a synthetic barcode module may communicate an id for the end user as well as other information about that end user, in addition to coupon data. Versatility is another advantage. The synthetic barcode module is adaptable to environments equipped with barcode scanners.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A synthetic barcode phone comprising:
    a light management module comprising display screen elements that emit light pulses that are sensible by a laser scanner and emulate light reflected from a scanned barcode, and a display controller that drives the display screen elements; and
    a processor operably coupled to the display controller, said processor receiving analog audio signals corresponding to at least one barcode and outputting driver signals to the display controller to cause the light management module to emit light pulses that are sensible by a laser scanner and emulate light reflected from a scanned barcode
    wherein the at least one barcode comprises a barcode of a coupon.

2. A synthetic barcode phone according to claim 1, wherein said display screen elements comprise one of an active matrix organic light emitting diode display and an active matrix RGB backlit liquid crystal display.

3. A synthetic barcode phone according to claim 2, further comprising an optical sensor operably coupled to the processor, said processor determining if received light pulses correspond to a barcode scanner by checking stimulus timing.

4. A synthetic barcode phone according to claim 3, said optical sensor comprising a charged couple device camera.

5. A synthetic barcode phone according to claim 3, said optical sensor comprising a CMOS camera.

6. A synthetic barcode phone according to claim 3, said optical sensor comprising an ambient light sensor.

7. A synthetic barcode phone according to claim 1, wherein said display screen elements comprise an active matrix organic light emitting diode display and said display controller comprises a thin film transistor controller.

8. A synthetic barcode phone according to claim 1, wherein said display screen elements comprise an active matrix RGB backlit liquid crystal display and said display controller comprises a backlight controller and an LCD controller.

9. A coupon management system, said system comprising:
    a synthetic barcode phone comprising:
        a light management module comprising display screen elements that emit light pulses that are sensible by a laser scanner and emulate light reflected from a scanned barcode, and a display controller that drives the display screen elements; and
        a processor operably coupled to the display controller, said processor receiving analog audio signals corresponding to at least one barcode and outputting driver signals to the display controller to cause the light management module to emit light pulses that are sensible by a laser scanner and emulate light reflected from a scanned barcode; and
    a receiver for receiving at least one coupon code from a remote source; and
    a client application executable by said processor, said client application managing user selection and use of the at least one coupon code; and
    wherein said display screen elements comprise one of an active matrix organic light emitting diode display and an active matrix RGB backlit liquid crystal display; and the synthetic barcode phone includes a microphone operably coupled to the processor, and the client application is configured to detect, via said microphone, an audible signal corresponding to a successful scan.

10. A coupon management system according to claim 9, wherein said display screen elements comprise an active matrix organic light emitting diode display and said display controller comprises a thin film transistor controller.

11. A coupon management system according to claim 9, wherein said display screen elements comprise an active matrix RGB backlit liquid crystal display and said display controller comprises a backlight controller and an LCD controller.

12. A coupon management system according to claim 9, further comprising an optical sensor operably coupled to the processor, said processor determining if received light pulses correspond to a barcode scanner by checking stimulus timing.

13. A coupon management system according to claim 12, said optical sensor comprising a charged couple device camera.

14. A coupon management system according to claim 12, said optical sensor comprising a CMOS camera.

15. A coupon management system according to claim 12, said optical sensor comprising an ambient light sensor.

16. A coupon management system according to claim 9, wherein the at least one coupon code comprises a plurality of coupon codes in a queue on the synthetic barcode phone, and said client application provides controls sending a next coupon code in the queue from the cellular telephone to the module upon detecting the audible signal corresponding a successful scan.

\* \* \* \* \*